(12) United States Patent
Lathim

(10) Patent No.: US 9,137,967 B2
(45) Date of Patent: Sep. 22, 2015

(54) FEED DISPENSER APPARATUS

(76) Inventor: Del Lathim, Pasco, WA (US)

(\*) Notice: Subject to any disclaimer, the term of this patent is extended or adjusted under 35 U.S.C. 154(b) by 422 days.

(21) Appl. No.: 12/944,624

(22) Filed: Nov. 11, 2010

(65) Prior Publication Data

US 2011/0114219 A1 May 19, 2011

Related U.S. Application Data

(60) Provisional application No. 61/261,058, filed on Nov. 13, 2009.

(51) Int. Cl.
*A01K 5/01* (2006.01)
*A01K 5/02* (2006.01)

(52) U.S. Cl.
CPC ............. *A01K 5/0114* (2013.01); *A01K 5/0225* (2013.01)

(58) Field of Classification Search
CPC ........................ A01K 5/0114; A01K 5/0225
USPC ................ 119/51.01, 51.12, 52.1, 54, 58, 59, 119/61.1, 61.5, 65, 74, 77; 222/105, 106, 222/107, 181.1, 181.2, 185.1, 186, 192
See application file for complete search history.

(56) References Cited

U.S. PATENT DOCUMENTS

| | | | |
|---|---|---|---|
| 1,186,369 A | 6/1916 | Barlow | |
| 1,533,627 A | 4/1925 | Averill | |
| 1,815,964 A | 7/1931 | Boyer | |
| 1,816,684 A | 7/1931 | Liechty | |
| D106,782 S * | 11/1937 | De Benque | D7/553.1 |
| 2,207,417 A * | 7/1940 | Smith | 220/575 |
| D176,252 S * | 12/1955 | Norman | D7/555 |
| 2,843,287 A * | 7/1958 | Finley | 220/575 |
| 2,943,600 A * | 7/1960 | Rosoff | 119/464 |
| 3,354,868 A * | 11/1967 | Woodling | 119/52.2 |
| 3,763,826 A * | 10/1973 | Portelli | 119/52.1 |
| D244,948 S * | 7/1977 | Foley et al. | D30/130 |
| 4,120,420 A * | 10/1978 | Dirksing | 229/117.3 |
| 4,562,940 A * | 1/1986 | Asphar | 222/88 |
| 4,573,434 A | 3/1986 | Gardner | |
| 4,721,063 A * | 1/1988 | Atchley | 119/52.1 |
| 5,016,572 A * | 5/1991 | Weber et al. | 119/52.1 |
| 5,259,336 A | 11/1993 | Clark | |
| 5,273,083 A | 12/1993 | Burrows | |
| D350,842 S | 9/1994 | VanSkiver | |
| 5,344,048 A * | 9/1994 | Bonerb | 222/105 |
| D374,516 S * | 10/1996 | Lillelund et al. | D30/132 |

(Continued)

OTHER PUBLICATIONS

"Non-Final Office Action", From U.S. Appl. No. 12/946,734, filed Nov. 15, 2010, Mailed Jan. 19, 2012.
"Response to the Jan. 19, 2012 Non-Final Office Action", From U.S. Appl. No. 12/946,734, filed Mar. 22, 2012.

(Continued)

*Primary Examiner* — Rob Swiatek
*Assistant Examiner* — Ebony Evans
(74) *Attorney, Agent, or Firm* — Rainier Patents, P.S.; Paul W. Mitchell

(57) ABSTRACT

A feed dispensing apparatus including a feed storage portion configured to define a feed receiving volume for receiving a feed bag. This feed dispensing apparatus also includes a feed presentation portion that defines an opening proximate the feed receiving volume through which a user can open the feed bag effective that feed automatically dispenses from the feed bag into the feed presentation portion in a self-regulating manner.

19 Claims, 4 Drawing Sheets

(56) References Cited

U.S. PATENT DOCUMENTS

| | | | | |
|---|---|---|---|---|
| D402,425 S | * | 12/1998 | Lacz et al. | D30/121 |
| 6,109,315 A | * | 8/2000 | Stern | 141/330 |
| 6,152,302 A | * | 11/2000 | Miller et al. | 206/549 |
| 6,581,540 B1 | * | 6/2003 | LaVanish | 119/51.01 |
| 6,863,025 B2 | | 3/2005 | Ness | |
| 6,953,069 B2 | * | 10/2005 | Galomb | 141/330 |
| 7,234,418 B2 | | 6/2007 | Fort et al. | |
| 2006/0231040 A1 | | 10/2006 | Bast et al. | |
| 2007/0119378 A1 | * | 5/2007 | Fick | 119/52.1 |
| 2009/0188432 A1 | * | 7/2009 | McMullen | 119/57.9 |
| 2011/0114026 A1 | | 5/2011 | Lathim | |

OTHER PUBLICATIONS

"Final Office Action", From U.S. Appl. No. 12/946,734, filed Nov. 15, 2010, Mailed Jul. 18, 2012.

"Response to the Jun. 18, 2012 Final Office Action", From U.S. Appl. No. 12/946,734, filed Jan. 16, 2013.

"Non-Final Office Action", From U.S. Appl. No. 12/946,734, filed Nov. 15, 2010, Mailed Dec. 26, 2013.

"Response to the Dec. 26, 2013 Non-Final Office Action", From U.S. Appl. No. 12/946,734, filed Apr. 28, 2014.

"Notice of Allowance", From U.S. Appl. No. 12/946,734, filed Nov. 15, 2010, Mailed Sep. 24, 2014.

* cited by examiner

FEED DISPENSER APPARATUS 100

FEED DISPENSER APPARATUS 100

FEED DISPENSER APPARATUS

PRIORITY

This patent application is a non-provisional utility application that claims priority from a provisional application having Ser. No. 61/261,058 filed on Nov. 13, 2009.

BRIEF DESCRIPTION OF THE DRAWINGS

The accompanying drawings illustrate implementations of the concepts conveyed in the present application. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the figure and associated discussion where the reference number is first introduced.

DETAILED DESCRIPTION

Overview

The present description relates to a feed dispenser apparatus or "feeder" that dispenses feed on demand. For example, the feed dispenser apparatus can be utilized as a feeder for domestic cats and/or dogs, among others.

Figure 1:
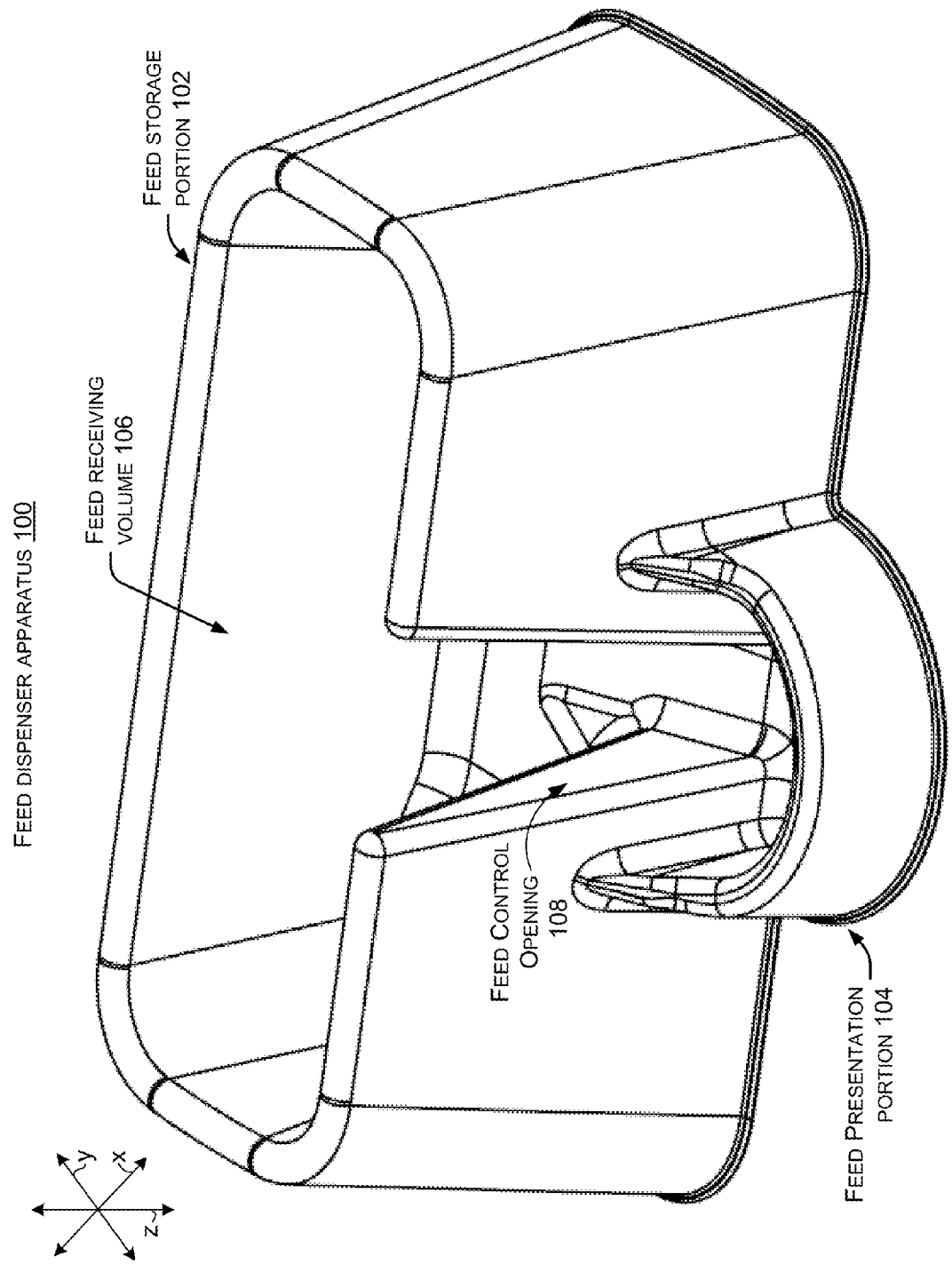
FIGS. 1-2 are perspective views of an example of a feed dispensing apparatus in accordance with some of the present concepts.
Figure 2:
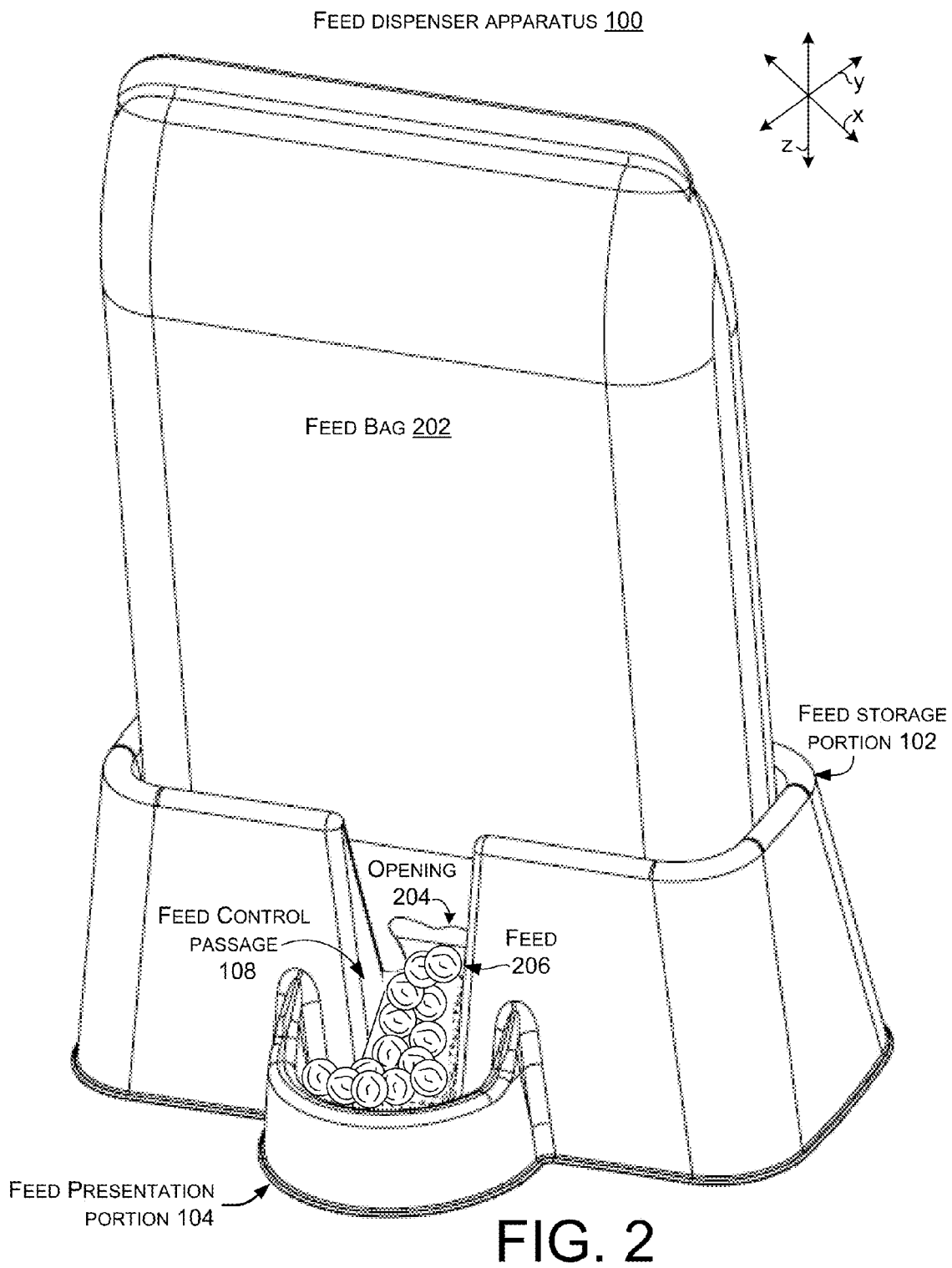

FIGS. 1-2 show an example of a feed dispenser apparatus 100 which can include a feed storage portion 102 and a feed presentation portion 104. Feed storage portion 102 can be configured to define a feed receiving volume 106. Feed storage portion 102 can be open to the feed presentation portion 104 via a feed control passage 108 defined by the feed dispenser apparatus 100.

FIG. 2 shows a feed bag 202 inserted into feed receiving volume 106 (designated in FIG. 1). The size of the feed receiving volume 106 can be selected to accommodate readily available bags of feed, such as 10 pound, 25 pound or 40 pound bags of feed, among others. Upon inserting feed bag 202, the user can make a small opening 204 in the feed bag proximate feed control passage 108. Feed 206 can automatically dispense through opening 204 and feed control passage 108 into feed presentation portion 104. Feed dispensing will automatically stop once feed starts to build up in the feed presentation portion 104. Consumption of feed from the feed presentation portion 104 causes feed to be automatically replenished from feed bag 202. Thus, this configuration can be thought of as providing automatic feeding in a self-regulated manner to avoid feed spillage, feed wastage and/or promote feed freshness. In summary, feed dispenser apparatus 100 offers automatic dispensing and replenishing of feed for consumption by the animal. In this example, once the user inserts feed bag 202 into feed receiving volume 106 and makes the small opening 204, no further user action is required until all of the feed is dispensed. It is worth noting that while not specifically shown, some implementations of feed dispenser apparatus 100 can include a mechanism to automatically open the feed bag upon insertion. Further, the feed control passage can define or provide a guide for an appropriate size for opening 204 thereby decreasing a likelihood of the user making an unnecessarily large hole that may lead to spillage and/or spoilage of the feed.

Beyond the ease of use offered by the present implementations, the inventive concepts offer additional potential advantages. For instance, feed can degrade over time. For example, feed can degrade because exposure to air can oxidize the feed. The oxidization can make the feed go rancid or otherwise degrade. To address this issue, feed manufacturers have created controlled environments within the feedbag. For instance, air impermeable liners are utilized to limit exposure to air. Further, some feed manufacturers have taken this a step further and control the environment within the feedbag. For instance, after feed is added to the feedbag, air may be purged from the feedbag and replaced with a more inert gas, such as nitrogen or carbon dioxide, among others. Another approach that is employed is to coat the inside of the feedbag with preservatives and/or antioxidants to slow down degradation of the feed. These configurations maintain the quality of the feed for an extended period of time.

However, existing feeders tend to require a user to open the feed bag and pour the feed into a bin, hopper or other container from which it is dispensed. This configuration defeats the efforts of the feed manufacturer and from this point forward the feed starts to degrade at an accelerated rate.

In contrast, the present implementations do not require transfer of the feed to a secondary container. Instead, these implementations can maintain a majority of the feed in the original feed bag. This configuration is more convenient for the user and can keep the feed with the feed bag's preservatives/antioxidants to slow degradation of the feed. Further still, the present implementations can utilize only a small opening in the feed bag through which the feed in dispensed. As a result, the internal environment of the feedbag can generally be maintained in the feed bag during use.

For instance, if the feed manufacturer replaced the ambient air in the feed bag 202 with a more inert gas, this inert gas may generally remain in the feed bag even after the feed bag is inserted into feed receiving volume 106 and opened. From one perspective, the present implementations limit or reduce the exposure of the feed to air and/or decrease airflow around the feed. Thus, the present implementations can slow degradation of the feed that results from traditional scenarios where a large portion of the feed bag is opened to the air and/or the feed is transferred to another container.

Figure 3:
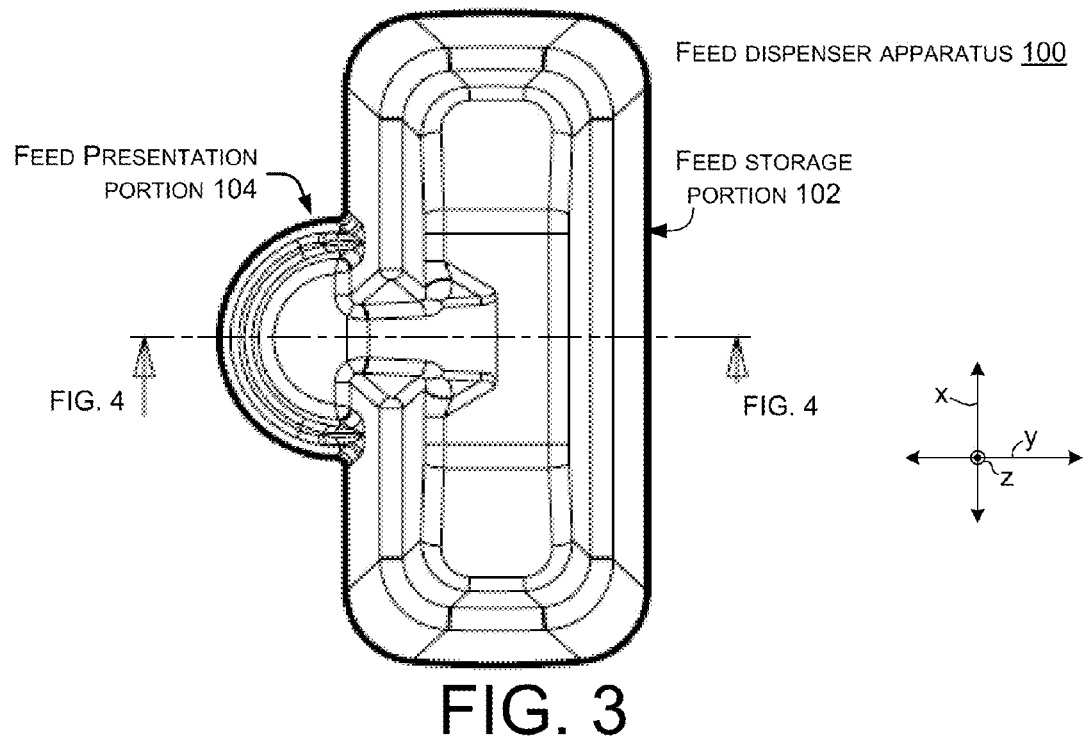
FIG. 3 is a top view of an example of a feed dispensing apparatus in accordance with some of the present concepts.
Figure 4:
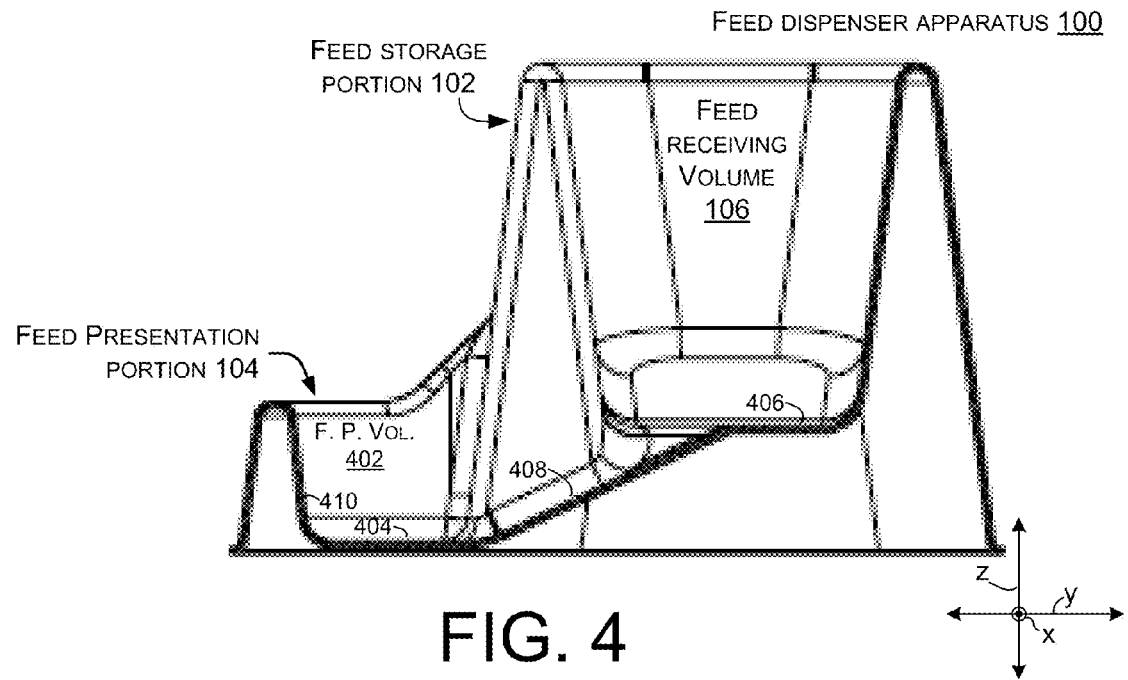
FIG. 4 is a sectional view as indicated in FIG. 3 of an example of a feed dispensing apparatus in accordance with some of the present concepts.

FIG. 3 shows a top view of feed dispenser apparatus 100. FIG. 4 shows a sectional view of the feed dispenser apparatus 100 as indicated in FIG. 3. FIG. 4 illustrates an example configuration for automatically dispensing feed from the feed bag on an as needed basis. In this case, feed presentation portion 104 can be thought of as defining a feed presentation volume 402. The feed presentation volume 402 can be partially defined by a bottom surface 404 of the feed presentation portion 104. Similarly, the feed storage portion can include a bottom surface 406 that partially defines feed presentation volume 402. In this implementation, the feed presentation portion's bottom surface 404 is lower than the feed storage portion's bottom surface 406. A feed ramp surface 408 connects bottom surface 406 to bottom surface 404. In this instance, the feed ramp surface 408 is slanted so that feed flows from the feed storage portion into the feed presentation portion. The feed begins to build up against a front surface 410 of the feed presentation portion 104. An equilibrium is reached between the level of the feed in feed presentation volume 402 and the feed in the feed bag such that further feed is not dispensed until some is removed from the feed presentation volume 402 by the animal. This configuration reduces waste and/or promotes high quality feed being automatically dispensed to the animal.

Figure 5:
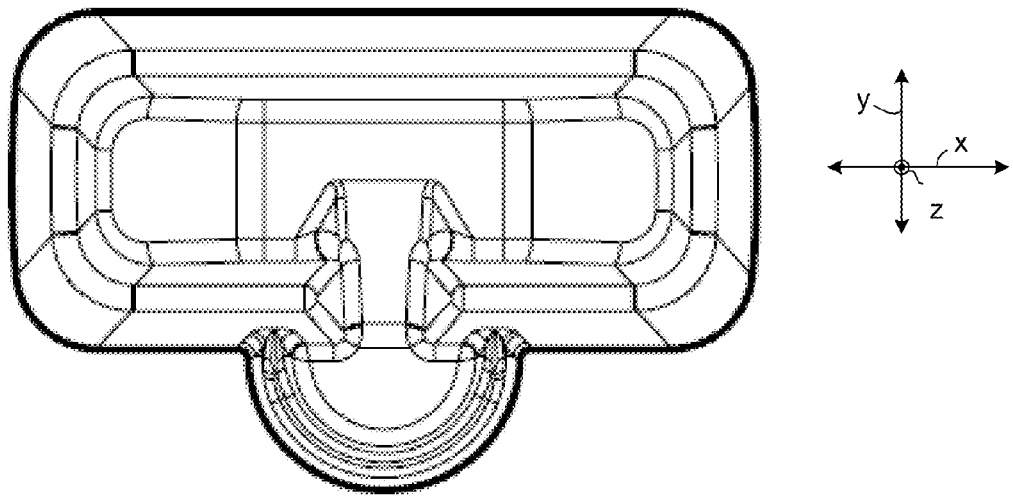
FIG. 5 is a top view of an example of a feed dispensing apparatus in accordance with some of the present concepts.
Figure 6:
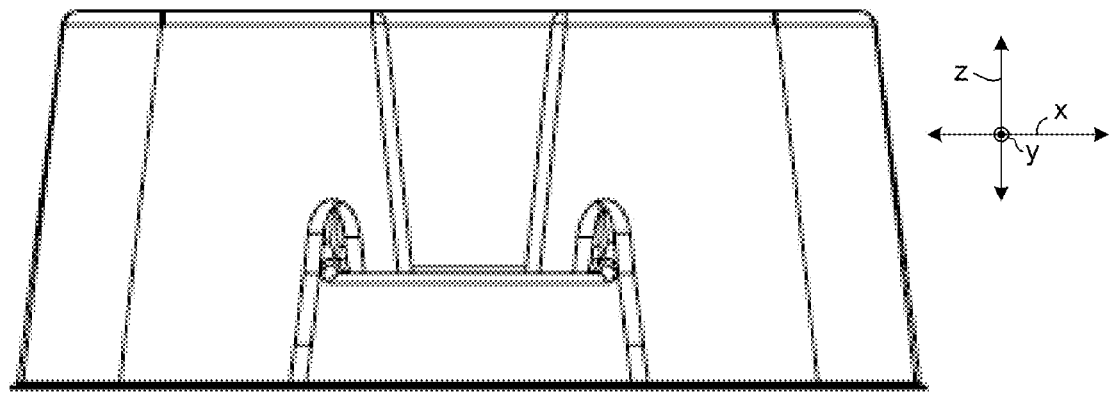
FIG. 6 is an elevational view of an example of a feed dispensing apparatus in accordance with some of the present concepts.

FIGS. 5-6 illustrate that at least some feed dispensing apparatus implementations can be configured to be nestably stackable. This configuration can reduce shipping costs so that a high quality product can be delivered to the user at a reduced cost. The feed dispensing apparatus can be constructed of any suitable material such as a polymer, plastic, or composite. Any traditional fabrication technique, such as injection molding can be utilized to form the feed dispensing apparatus.

Conclusion

Although specific examples of feed dispensing apparatus are described in language specific to structural features, it is to be understood that the subject matter defined in the appended claims is not intended to be limited to the specific features described. Rather, the specific features are disclosed as exemplary forms of implementing the claimed statutory classes of subject matter.

The invention claimed is:

1. A feed dispensing apparatus, comprising:
a feed storage portion having a bottom surface, the feed storage portion defining a feed receiving volume for receiving a feed bag, the feed storage portion having walls that define a rectangular shape when viewed along a vertical reference axis, the walls being angled such that the walls are oblique to the vertical reference axis and an upper end of the feed receiving volume is wider than a lower end of the feed receiving volume; and,
a feed presentation portion having another bottom surface that is lower than the bottom surface of the feed storage portion,
wherein the feed storage portion is open to the feed presentation portion via a feed control passage that defines an opening proximate to the feed receiving volume through which a user can open the feed bag effective that feed automatically dispenses from the feed bag, through the feed control passage, and into the feed presentation portion in a self-regulating manner,
further wherein the feed dispensing apparatus is configured to be nestably stackable such that the feed storage portion is able to nestably receive a feed storage portion of a second feed dispensing apparatus when the feed dispensing apparatus is stacked over the second feed dispensing apparatus.

2. The feed dispensing apparatus of claim 1, wherein the rectangular shape of the feed receiving volume has rounded corners, and further wherein the rectangular shape is shorter as measured parallel to an axis defined by the feed control passage and longer as measured horizontally and perpendicular to the axis defined by the feed control passage.

3. The feed dispensing apparatus of claim 1, further comprising a ramp surface that promotes feed transfer from the feed storage portion to the feed presentation portion until the feed encounters a front surface of the feed presentation portion.

4. The feed dispensing apparatus of claim 1, wherein a size of the feed receiving volume is selected to accommodate readily available bags of feed.

5. The feed dispensing apparatus of claim 1, formed as a single piece.

6. The feed dispensing apparatus of claim 1, produced by a molding process.

7. The feed dispensing apparatus of claim 1, formed from a polymer, plastic, or composite.

8. The feed dispensing apparatus of claim 1, formed as multiple pieces.

9. The feed dispensing apparatus of claim 1, wherein a front surface of the feed presentation portion has a curved shape.

10. The feed dispensing apparatus of claim 1, wherein outer walls of the feed storage portion are angled such that a top end of the feed storage portion is narrower than a bottom end of the feed storage portion.

11. The feed dispensing apparatus of claim 10, wherein the walls of the feed receiving volume and the outer walls of the feed storage portion define a space there between that is open at the bottom end.

12. A feed dispensing apparatus, comprising:
a feed storage portion having a bottom surface, the feed storage portion defining a rectangular feed receiving volume for receiving a feed bag; and,
a feed presentation portion having another bottom surface that is lower than the bottom surface of the feed storage portion,
wherein the feed storage portion is open to the feed presentation portion via a feed control passage that defines an opening proximate to the rectangular feed receiving volume through which feed automatically dispenses from the feed bag, through the feed control passage, and into the feed presentation portion in a self-regulating manner,
and further wherein walls of the feed receiving volume, feed control passage, and feed presentation portion are oblique with respect to a vertical reference axis.

13. The feed dispensing apparatus of claim 12, wherein the feed dispensing apparatus is configured to be nestably stackable with a second feed dispensing apparatus.

14. The feed dispensing apparatus of claim 12, formed as a single piece.

15. The feed dispensing apparatus of claim 12, formed as multiple pieces.

16. A feed dispensing apparatus, comprising:
a feed storage portion having linear sides and a bottom surface, the linear sides comprising non-vertical inner walls and non-vertical outer walls such that individual linear sides define inverted V-shapes, the feed storage portion defining a feed receiving volume for receiving a feed bag; and,
a feed presentation portion having a curved front side that is shorter than the linear sides of the feed storage portion, the feed presentation portion defining another bottom surface that is lower than the bottom surface of the feed storage portion,
wherein the feed storage portion is open to the feed presentation portion via a feed control passage having opposing non-vertical side walls that define an opening proximate to the feed receiving volume through which feed automatically dispenses from the feed bag, through the feed control passage, and into the feed presentation portion in a self-regulating manner.

17. The feed dispensing apparatus of claim 16, wherein the linear sides of the feed storage portion define a rectangular shape with rounded corners when viewed from above the feed dispensing apparatus.

18. The feed dispensing apparatus of claim 16, wherein the curved front side of the feed presentation portion has a non-vertical front surface and a non-vertical outer wall that define another inverted V-shape that is shorter than the inverted V-shapes of the linear sides of the feed storage portion.

19. The feed dispensing apparatus of claim 18, wherein the inverted V-shapes of the linear sides and the another inverted V-shape of the curved front side are open at bottom ends.

\* \* \* \* \*